US011828017B2

(12) United States Patent
Zhou

(10) Patent No.: US 11,828,017 B2
(45) Date of Patent: Nov. 28, 2023

(54) SELF CLEANING LINT FILTER FOR RECIRCULATING CONDENSER DRYER

(71) Applicant: Haier US Appliance Solutions, Inc., Wilmington, DE (US)

(72) Inventor: David Zhou, Louisville, KY (US)

(73) Assignee: Dority & Manning, P.A., Wilmington, DE (US)

( * ) Notice: Subject to any disclaimer, the term of this patent is extended or adjusted under 35 U.S.C. 154(b) by 348 days.

(21) Appl. No.: 17/116,055

(22) Filed: Dec. 9, 2020

(65) Prior Publication Data

US 2022/0178068 A1 Jun. 9, 2022

(51) Int. Cl.
| | | |
|---|---|---|
| *D06F 58/22* | (2006.01) | |
| *B01D 46/00* | (2022.01) | |
| *B01D 39/12* | (2006.01) | |
| *D06F 58/04* | (2006.01) | |
| *D06F 58/24* | (2006.01) | |
| *D06F 25/00* | (2006.01) | |
| *D06F 58/26* | (2006.01) | |
| *B01D 46/79* | (2022.01) | |

(52) U.S. Cl.
CPC .............. *D06F 58/22* (2013.01); *B01D 39/12* (2013.01); *B01D 46/0049* (2013.01); *B01D 46/79* (2022.01); *D06F 25/00* (2013.01); *D06F 58/04* (2013.01); *D06F 58/24* (2013.01); *D06F 58/26* (2013.01); *B01D 2273/30* (2013.01); *B01D 2275/201* (2013.01)

(58) Field of Classification Search
CPC .......... D06F 58/22; D06F 58/24; D06F 58/26; D06F 58/00; D06F 58/04; B01D 46/79; B01D 39/12; B01D 46/0049; B01D 2273/30; B01D 2275/201
USPC ............................................... 34/85, 595–610
See application file for complete search history.

(56) References Cited

U.S. PATENT DOCUMENTS

| | | | | |
|---|---|---|---|---|
| 3,579,851 A | * | 5/1971 | Elmy ...................... | D06F 34/08 34/82 |
| 4,106,214 A | * | 8/1978 | Schmidt .................. | D06F 58/20 34/607 |
| 4,462,170 A | * | 7/1984 | Burkall ................... | D06F 58/22 34/605 |
| 4,546,554 A | * | 10/1985 | Bullock .................. | D06F 58/30 34/554 |
| 9,194,073 B2 | * | 11/2015 | Kwon ..................... | D06F 58/26 |

(Continued)

FOREIGN PATENT DOCUMENTS

| | | |
|---|---|---|
| DE | 102017116611 A1 | 2/2018 |
| JP | 6373020 B2 | 8/2018 |
| WO | WO2005/054563 A1 | 6/2005 |

*Primary Examiner* — Stephen M Gravini
(74) *Attorney, Agent, or Firm* — Dority & Manning, P.A.

(57) ABSTRACT

A laundry treatment appliance includes a cabinet, a door to selectively open and close the cabinet, a tub mounted within the cabinet, a drum rotatably mounted within the tub, an air circulation duct provided in the cabinet and having a first end connected to an air outlet of the tub and a second end connected to an air inlet of the tub, and a filter provided within the air circulation duct. The filter defines a cool air end having a perimeter thereof attached to an interior wall of the circulation duct and a warm air end having a perimeter thereof spaced apart from the interior wall of the circulation duct, and the second end is positioned below the first end in a vertical direction.

18 Claims, 3 Drawing Sheets

(56) References Cited

U.S. PATENT DOCUMENTS

| | | | |
|---|---|---|---|
| 10,544,539 B2 | 1/2020 | Bocchino et al. | |
| 10,975,516 B2* | 4/2021 | Bailey | D06F 58/22 |
| 11,118,304 B2* | 9/2021 | Hato | D06F 58/22 |
| 2012/0036730 A1* | 2/2012 | Sans Rovira | D06F 58/20 |
| | | | 34/85 |
| 2012/0096733 A1* | 4/2012 | Sans Rovira | D06F 58/20 |
| | | | 34/108 |
| 2012/0144687 A1* | 6/2012 | Yeom | D06F 58/22 |
| | | | 34/82 |
| 2022/0178068 A1* | 6/2022 | Zhou | D06F 58/26 |

* cited by examiner

SELF CLEANING LINT FILTER FOR RECIRCULATING CONDENSER DRYER

FIELD OF THE INVENTION

The present subject matter relates generally to laundry treatment appliances, and more particularly to lint filters provided within laundry treatment appliances.

BACKGROUND OF THE INVENTION

Generally, laundry treatment appliances perform washing or drying operations on laundry such as clothing. Recently, laundry treatment appliances have been configured to perform both washing and drying operations with a single machine. These combination laundry treatment appliances may have complex systems incorporated to circulate both water and air through a tub and/or drum in order to perform each of the washing and drying operations. Particularly in drying operations, foreign materials such as lint and other debris may be circulated through an air circulation duct along with the air. As such, a filter or filters are required to remove the foreign materials and prevent them from clogging various machinery incorporated within the appliance.

However, problems exist in these combination laundry treatments appliances. For instance, when an air circulation duct is provided at a rear of the appliance, it is not easy to access a filter provided in the air circulation duct. Therefore, complex deconstruction is required to clean or change the filter. Further, in order to place a filter in an easily accessible location, a placement of the air circulation duct may lead to inefficient drying operations and increased costs or operation times.

Accordingly, a laundry treatment appliance featuring a filter that obviates one or more of these drawbacks would be desirable. In particular, a laundry treatment appliance including a self-cleaning lint filter would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a laundry treatment appliance is disclosed. The laundry treatment appliance may include a cabinet, a door to selectively open and close the cabinet, a tub mounted within the cabinet, a drum rotatably mounted within the tub, an air circulation duct provided in the cabinet and having a first end connected to an air outlet of the tub and a second end connected to an air inlet of the tub, and a filter provided within the air circulation duct. The filter may define a cool air end having a perimeter thereof attached to an interior wall of the circulation duct and a warm air end having a perimeter thereof spaced apart from the interior wall of the circulation duct, and the second end may be positioned below the first end in a vertical direction.

In another exemplary aspect of the present disclosure, a clothes treatment appliance is disclosed. The clothes treatment appliance may include a cabinet, a door to selectively open and close the cabinet, a drum mounted within the cabinet, an air circulation duct provided in the cabinet and having a first end connected to an air outlet of the drum and a second end connected to an air inlet of the drum, and a filter provided within the air circulation duct. The filter may define a cool air end having a perimeter thereof attached to an interior wall of the circulation duct and a warm air end having a perimeter thereof spaced apart from the interior wall of the circulation duct, and the warm air end may be positioned below the cool air end in the vertical direction. The filter may define a conical taper from the cool air end to the warm air end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
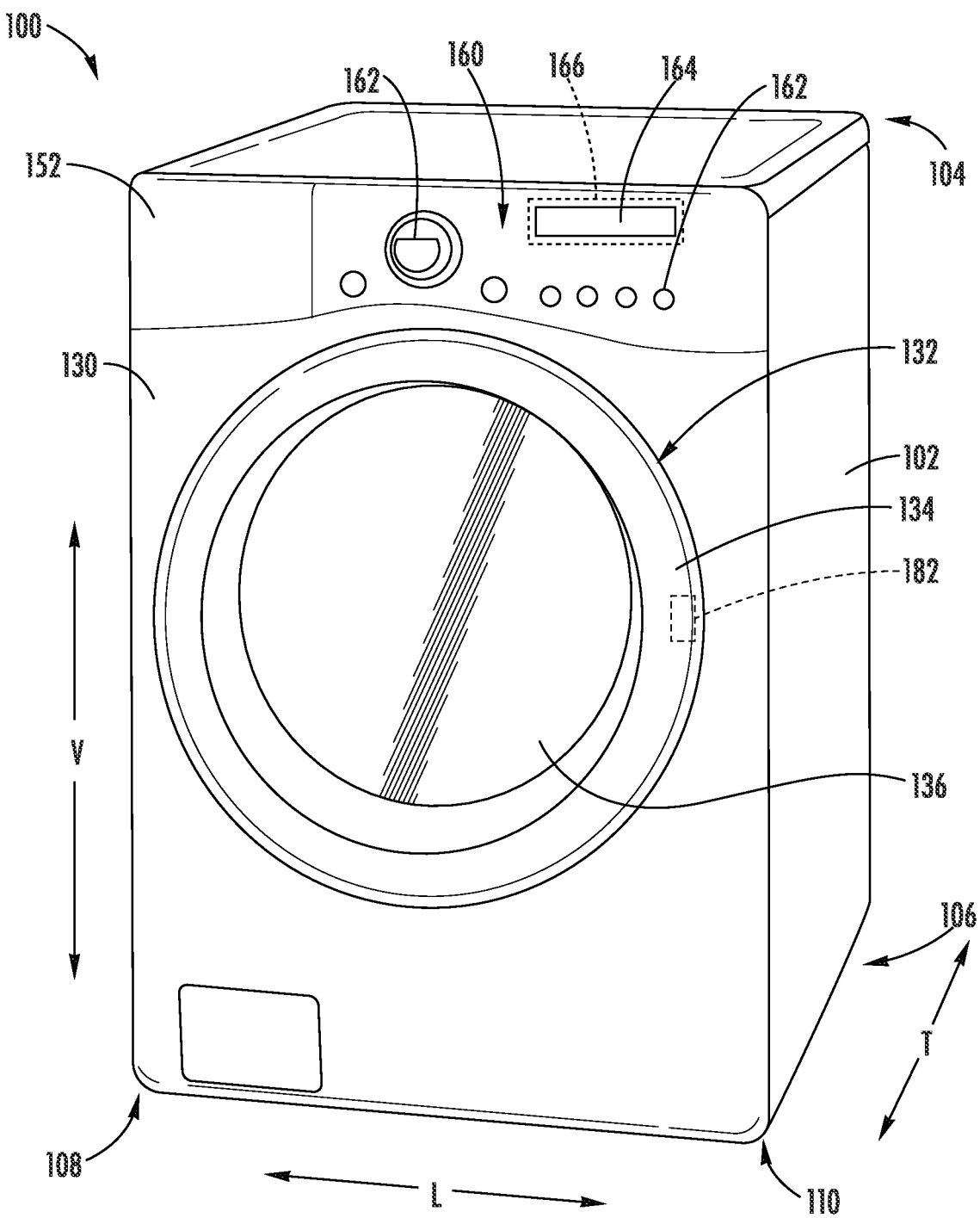
FIG. 1 provides a perspective view of a laundry treatment appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "first," "second," and "third" may be used interchangeably to distinguish one element from another and are not intended to signify location or importance of the individual elements. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, it should also be appreciated, that as used herein, terms of approximation, such as "approximately" and "about," refer to being within a ten percent margin of error.

Figure 2:
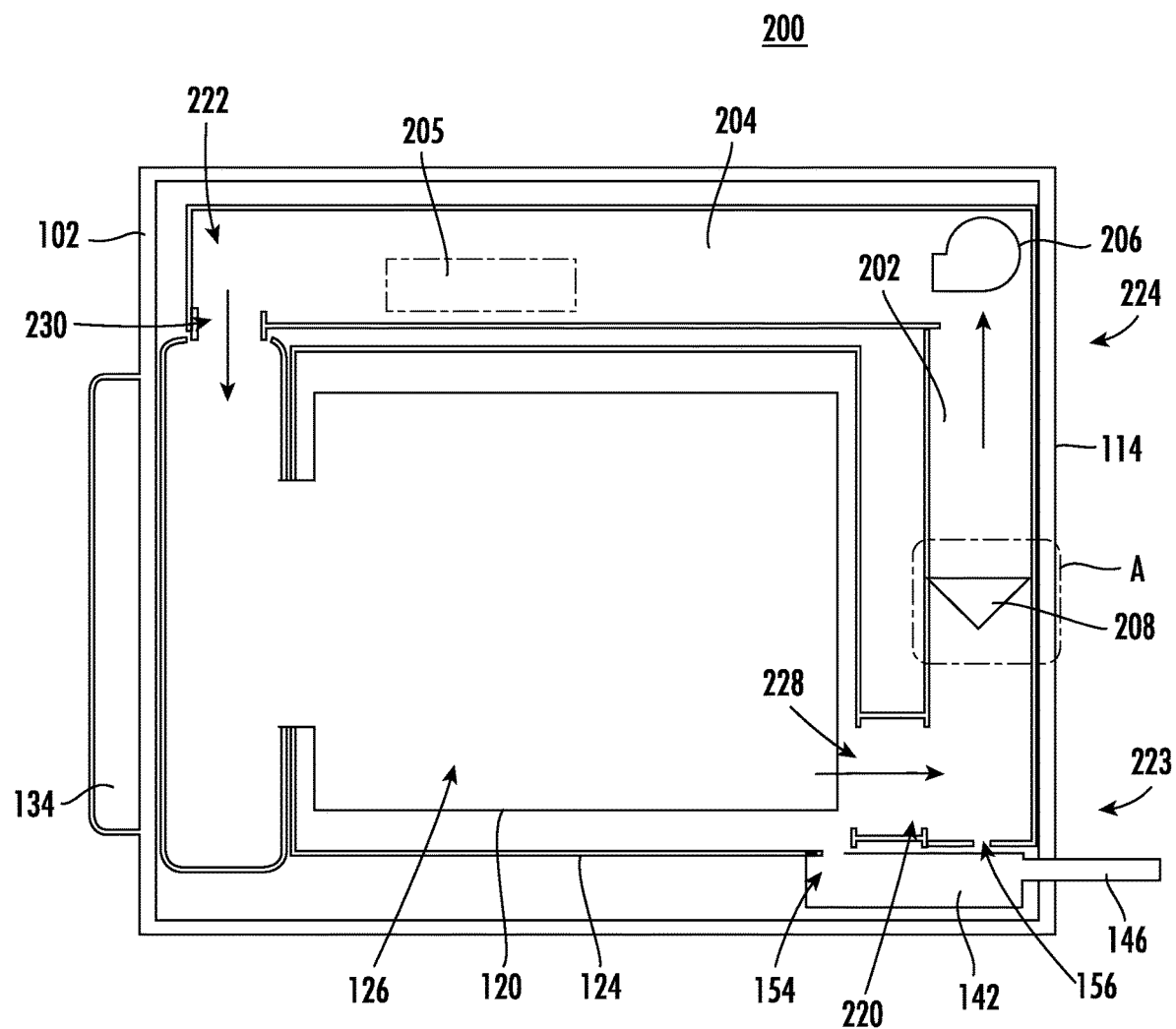
FIG. 2 provides a side cross-sectional view of the exemplary laundry treatment appliance of FIG. 1.
Figure 3:
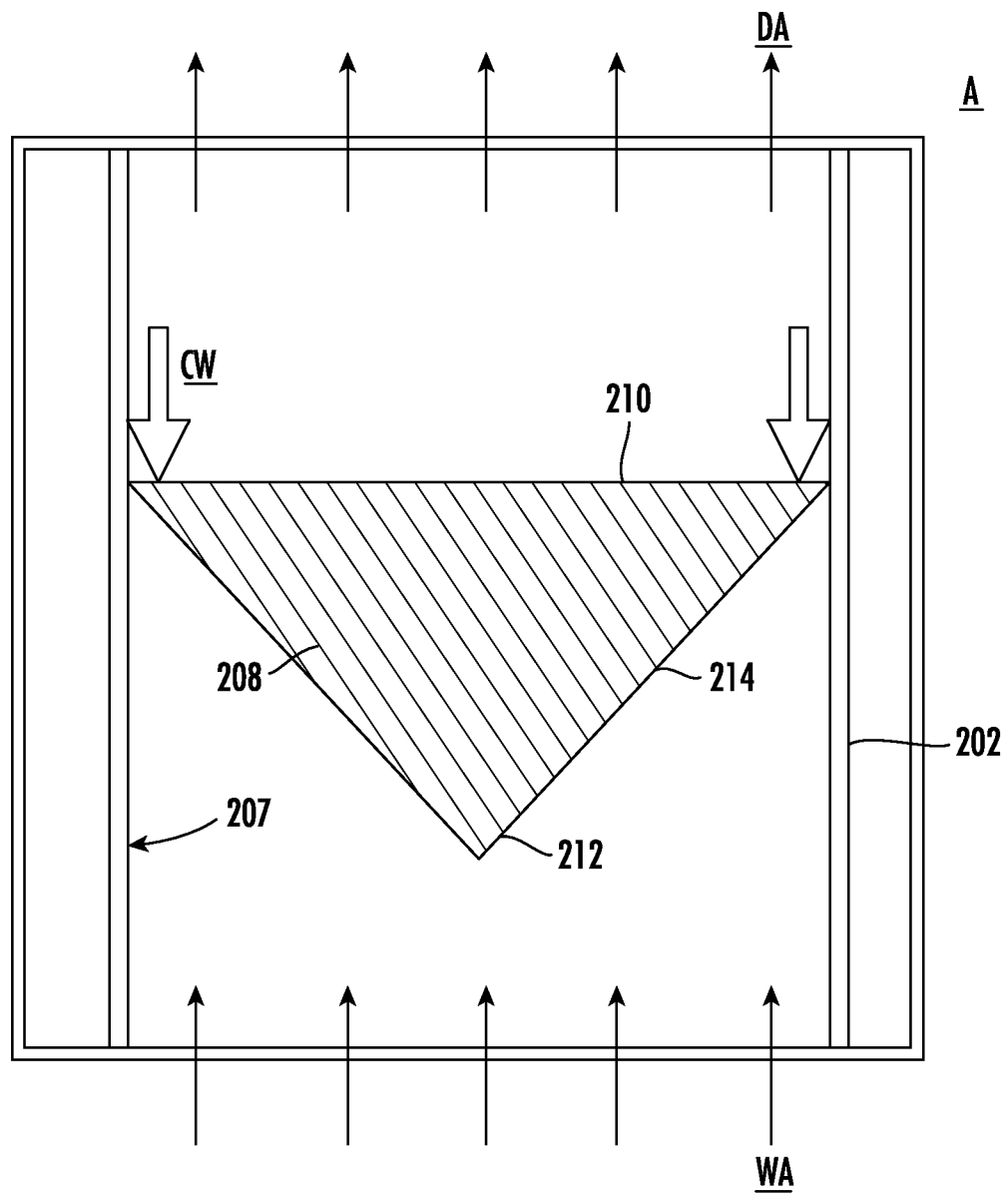
FIG. 3 provides an enlarged cross-sectional view of a filter of the exemplary laundry treatment appliance of FIG. 2.

Referring now to the figures, FIG. 1 is a perspective view of an exemplary front-load laundry treatment appliance 100, and FIG. 2 is a side cross-sectional view of laundry treatment appliance 100. FIG. 3 is an enlarged cross-sectional view of a filter 208 of the exemplary laundry treatment appliance 100. As illustrated, laundry treatment appliance 100 generally defines a vertical direction V, a lateral direction L, and a transverse direction T, each of which is mutually perpendicular, such that an orthogonal coordinate system is defined. Laundry treatment appliance 100 may include a cabinet 102 that extends between a top 104 and a bottom 106 along the vertical direction V, between a left side 108 and a right side 110 along the lateral direction L, and between a front 112 and a rear 114 along the transverse direction T.

A laundry tub 124 may be positioned within cabinet 102 and is generally configured for retaining wash fluids during an operating cycle. As used herein, "wash fluid" may refer to water, detergent, fabric softener, bleach, or any other suitable wash additive (including combinations thereof). Laundry tub 124 may be substantially fixed relative to cabinet 102 such that it does not rotate or translate relative to cabinet 102.

A basket 120 (i.e., drum) may be received within laundry tub 124 and define a wash chamber 126 that is configured for receipt of articles for washing. More specifically, basket 120 may be rotatably mounted within laundry tub 124 such that it is rotatable about a rotation axis. Generally, rotation axis is defined non-parallel to the vertical direction V (e.g., closer to perpendicular than parallel). According to the illustrated embodiments, the rotation axis is substantially parallel to the transverse direction T. In this regard, laundry treatment appliance 100 is generally referred to as a "horizontal-axis" or "front-load" laundry treatment appliance 100. Thus, tub 124 (e.g., at front opening 132) may define an uppermost or top apex and a lowermost or bottom apex.

While described in the context of a specific embodiment of front load laundry treatment appliance 100, using the teachings disclosed herein it will be understood that front load laundry treatment appliance 100 is provided by way of example only. Other laundry treatment appliances having different configurations, different appearances, or different features may also be utilized with the present subject matter as well.

Basket 120 may define one or more agitator features that extend into wash chamber 126 to assist in agitation and cleaning articles disposed within wash chamber 126 during operation of laundry treatment appliance 100. For example, a plurality of ribs may extend from basket 120 into wash chamber 126. In this manner, for example, ribs may lift articles disposed in basket 120 during rotation of basket 120.

Laundry treatment appliance 100 may include a motor assembly 122 that is in mechanical communication with basket 120 to selectively rotate basket 120 (e.g., during an agitation, rinse, or drying cycle of laundry treatment appliance 100). According to the illustrated embodiments, motor assembly 122 is a pancake motor. However, it should be appreciated that any suitable type, size, or configuration of motor may be used to rotate basket 120 according to alternative embodiments.

As shown in FIGS. 1 and 2, cabinet 102 may include a front panel 130 that defines, at least in part, an opening 132 that permits user access to basket 120 of laundry tub 124. More specifically, laundry treatment appliance 100 may include a door 134 that is positioned over opening 132 and is rotatably mounted to front panel 130 (e.g., about a door axis that is substantially parallel to the vertical direction V). In this manner, door 134 permits selective access to opening 132 by being movable between an open position (not shown) facilitating access to a laundry tub 124 and a closed position (FIG. 1) prohibiting access to laundry tub 124. Optionally, a lock assembly 182 may be fixed to cabinet 102 to selectively lock or hold a free end of the door 134 to cabinet 102 when door 134 is in the closed position (e.g., during certain operations or wash cycles or drying cycles).

In some embodiments, a central body 136 of door 134 may be provided on a perimeter rim 135 that extends about (e.g., radially about) at least a portion of central body 136. In optional embodiments, central body 136 is provided as a window and permits viewing of basket 120 when door 134 is in the closed position (e.g., during operation of laundry treatment appliance 100). Generally, door 134 defines a footprint on a front portion of cabinet 102 (e.g., in a plane defined by the lateral direction L and the transverse direction T). For instance, when door 134 is in the closed position, central body 136 and perimeter rim 135 may extend across the footprint and thus cover the area of the front panel 130 within the footprint (e.g., when viewed along the transverse direction T directly in front of laundry treatment appliance 100). As shown, particularly in FIG. 3, the footprint may extend radially outward from opening 132. Thus, the footprint may encompass and define a larger width (e.g., diameter) than opening 132. In some such embodiments, central body 136 extends across and, optionally, within opening 132. Perimeter rim 135 may extend radially outward from opening 132 and define the extrema of the footprint.

Door 134 may also include a handle (not shown) that, for example, a user may pull when opening and closing door 134. Further, although door 134 is illustrated as mounted to front panel 130, it should be appreciated that door 134 may be mounted to another side of cabinet 102 or any other suitable support according to alternative embodiments. Additionally or alternatively, a front gasket or baffle may extend between tub 124 and the front panel 130 about the opening 132 covered by door 134, further sealing tub 124 from cabinet 102. For example, when door 134 is in the closed position, baffle may contact central body 136 in sealing engagement therewith and within the footprint of door 134.

Basket 120 may define a plurality of perforations in order to facilitate fluid communication between the interior or wash chamber 126 of basket 120 and laundry tub 124. A sump 142 may be defined by laundry tub 124 at a bottom of laundry tub 124 along the vertical direction V. Thus, sump 142 is configured for receipt of, and generally collects, wash fluid during operation of laundry treatment appliance 100. For example, during operation of laundry treatment appliance 100, wash fluid may be urged (e.g., by gravity) from basket 120 to sump 142 through plurality of perforations. In some embodiments, a pump assembly is located beneath laundry tub 124 for gravity assisted flow when draining laundry tub 124 (e.g., via a drain 146). A pump assembly may also be configured for recirculating wash fluid within laundry tub 124.

In some embodiments, a control panel 160 including a plurality of input selectors 162 is coupled to front panel 130. Control panel 160 and input selectors 162 may collectively form a user interface input for operator selection of machine cycles and features. For example, in exemplary embodiments, a display 164 indicates selected features, a countdown timer, or other items of interest to machine users.

Operation of laundry treatment appliance 100 is generally controlled by a controller or processing device 166. In some embodiments, controller 166 is in operative communication with (e.g., electrically or wirelessly connected to) control panel 160 for user manipulation to select machine cycles and features. In response to user manipulation of control panel 160, controller 166 operates the various components of laundry treatment appliance 100 to execute selected machine cycles and features (e.g., as part of a washing or drying operation).

Controller 166 may include a memory (e.g., non-transitive memory) and microprocessor, such as a general or special purpose microprocessor operable to execute programming instructions or micro-control code associated with a wash operation. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Control panel 160 and other components of laundry treatment appliance 100, such as a motor assembly and a dispensing assembly, may be in operative communication with controller 166 via one or more signal lines or shared communication busses. Additionally or alternatively, other features, such as electronic lock assembly 182 for door 134 may be in operative communication with controller 166 via one or more other signal lines or shared communication busses.

Further, laundry treatment appliance 100 may perform a drying operation in addition or alternatively to the washing operation. Referring now to FIG. 2, laundry tub 124 may define an air outlet 228. Air outlet 228 may be located at a rear portion of laundry tub 124. For instance, air outlet 228 may be located at a lower portion of the rear portion of laundry tub 124. Any suitable location of air outlet 228 may be incorporated, however. Air having been circulated through laundry tub 124 (e.g., during a drying operation) may exit laundry tub 124 via air outlet 228 throughout the drying operation. Laundry tub 124 may define an air inlet 230. Air inlet 130 may be located at an upper front portion of laundry tub 124. Air (e.g., heated air for drying) may enter laundry tub 124 via air inlet 130 to perform a drying operation on laundry items within laundry tub 124 (or basket 120).

Laundry treatment appliance 100 may further include an air circulation duct 200. Air circulation duct 200 may define a passageway through which air may be circulated from air outlet 228 of laundry tub 124 to air inlet 230 of laundry tub 124. Air circulation duct 200 may include a condensing duct 202 and a heating plenum 204. Condensing duct 202 may extend along the rear 114 of cabinet 102 in a predominantly vertical direction (e.g., the vertical direction V). Condensing duct 202 may extend from a bottom of laundry tub 124 to the top 104 of cabinet 102. In some operations, warm moist air that exits laundry tub 124 during a drying operation contacts a relatively cool surface of condensing duct 202. Accordingly, moisture may condense from the warm air and form water (e.g., water droplets) within condensing duct 202. Condensing duct 202 may be made from a metal (e.g., aluminum or steel, including alloys thereof) or plastic, for example.

A lint filter 208 may be provided within the condensing duct 202. For example, the filter 208 may be located at a predetermined distance from a lower end 223 of condensing duct 202 (e.g., at about a midpoint of condensing duct 202). For instance, filter 208 may be located between a bottom 223 of condensing duct 202 and a midpoint of condensing duct. In detail, filter 208 may be provided in a bottom half of condensing duct 202. Advantageously, the water condensed at or near a top of condensing duct 202 may flow downward from a position above filter 208 in the vertical direction V. It should be noted that the mechanism to condense moisture from the air may be cold water from the home supply that is fed into the upper end 224 of condensing duct 202 at a relatively low flow rate. This cold water may flow along interior wall 207 of condensing duct 202 and fall to lower end 223 of condensing duct 202 where it enters laundry tub 124 to be drained from laundry treatment appliance 100. Warm air entering condensing duct 202 and blowing in the opposite direction of the flow of cold water may be cooled by convection contact with the cold water, thus condensing and removing moisture from the warm air. This cold water used to cool and condense the warm air may be the primary force for rinsing/cleaning filter 208. Generally, filter 208 defines a plurality of filtration apertures to permit air therethrough. Thus, filter 208 may filter out foreign material (e.g., lint, threads, etc.) that exits laundry tub 124 along with the air. Accordingly, filter 208 may be composed of any suitable material capable of allowing air flow through while restraining foreign materials. In some embodiments, filter 208 is composed of a wire mesh.

As best seen in FIG. 3, filter 208 may include a cool air end 210 and a warm air end 212. Cool air end 210 may be located downstream from warm air end 212 (e.g., relative to the direction of air flow motivated by a blower fan 206). In some embodiments, cool air end 210 is provided above warm air end 212 in the vertical direction V. Cool air end 210 may define a first perimeter. The first perimeter may be an outer edge (e.g., an outer circumference) of cool air end 210. In some embodiments, cool air end 210 of filter 208 is circular, and the first perimeter defines a first outer circumference having dimensions substantially equal to a circumference of an interior wall 207 of condensing duct 202. Accordingly, the first perimeter may be sized such that filter 208 spans or covers an entirety of a cross section of condensing duct 202. Filter 208 may be fixed to interior wall 207 of condensing duct 202 by any suitable means. For instance, filter 208 may be screwed or bolted to interior wall 207, may be fixed to interior wall 207 by an adhesive, may be spring loaded against interior wall 207, or the like. During use, air passing through condensing duct 202 is forced through filter 208. Therefore, filter 208 may advantageously and effectively filter out foreign materials contained in the air from laundry tub 124.

Warm air end 212 of filter 208 may be provided opposite cool air end 210. In detail, the airflow from laundry tub 124 (e.g., motivated by blower fan 206) may initially contact warm air end 212 of filter 208. Warm air end 212 may define a second perimeter. The second perimeter may be smaller than the first perimeter. In other words, filter 208 may taper from cool air end 210 toward warm air end 212. In this manner, the second perimeter may be spaced apart (e.g., radially inward) from interior wall 207 of condensing duct 202. In some embodiments, filter 208 has a conical shape, such that second perimeter is effectively zero (i.e., warm air end 212 tapers to a point). Accordingly, a surface 214 of filter 208 may define a contact portion for the air (e.g., warm moist air) from laundry tub 124 to initially meet upon reaching filter 208. The foreign materials (e.g., lint, etc.) filtered out by filter 208 may thus contact and adhere to the surface 214 of warm air end 212. In some embodiments, surface 214 is a conical surface.

Because filter 208 may be provided in condensing duct 202, and condensing duct 202 may condense water from the warm moist air from laundry tub 124, the condensed water produced by condensing duct 202 may contact with filter 208 (e.g., surface 214), effectively removing at least a portion of the foreign materials that adhere to filter 208. Additionally or alternatively, as mentioned above, cold water supplied from the home supply may contact with filter 208 to collect and remove foreign materials that adhere to filter 208. In detail, water droplets may form as condensed water on interior wall 207 of condensing duct 202. The condensed water may then proceed downward in the vertical direction V along interior wall 207. Due to the first perimeter of cool air end 210 of filter 208 being in contact with interior wall 207, some of the condensed water may run down surface 214 of filter 208, capturing or otherwise absorbing foreign materials. In turn, the foreign materials may be forced (e.g., directly or indirectly) by gravity and the flow of condensed water along filter 208. Accordingly, the condensed water may remove the foreign materials adhered to surface 214 as they proceed along surface 214 due to gravity.

Heating plenum 204 may be provided at or near a top of cabinet 102 (e.g., above laundry tub 124 in the vertical direction V). Heating plenum 204 may extend from upper end 224 of condensing duct 202 to air inlet 230 of laundry tub 124. Heating plenum 204 may extend generally in the transverse direction, however a reasonable person would understand that the direction and orientation of heating plenum 204 is not limited, and any suitable position or orientation of heating plenum 204 may be incorporated.

Generally, a blower fan 206 is provided in (or otherwise in fluid communication with) circulation duct 200. For instance, blower fan 206 may be provided within heating plenum 204. In some embodiments, blower fan 206 is provided at or near a junction between heating plenum 204 and upper end 224 of condensing duct. Thus, filter 208 may be provided upstream from blower fan 206. Accordingly, blower fan 206 may circulate air through air circulation duct 200 from air outlet 228 of laundry tub 124 to air inlet 230 of laundry tub 124. Further, filter 208 may filter out the foreign materials from the air before the air enters blower fan 206. Advantageously, blower fan 206 may experience fewer blockages due to lint or other debris becoming caught in blower fan 206, leading to better efficiency, reduced electricity costs, reduced need for repair, or longer life for the appliance 100, generally.

A heater 205 may be provided in thermal communication with heating plenum 204. For instance, heater 205 may be disposed on or within heating plenum 204 (e.g., downstream from filter 208). Heater 205 may be any suitable heating element capable of providing heat to the air circulated by blowing fan 206. For example, heater 205 may be an electric heating element (e.g., resistive heating element, halogen heating element, etc.), a gas heater, a heat pipe, or the like. Heater 205 may be located at any position within heating plenum 204. In some embodiments, heater 205 is provided near air inlet 230 of laundry tub 124. Accordingly, air entering laundry tub 124 may be properly heated before entering laundry tub 124 in order to improve drying efficiency.

Laundry tub 124 may further define a first drain opening 154. First drain opening 154 may be defined at a bottom portion of laundry tub 124. Water used in a washing operation, or water removed from laundry in a drying operation may be drained from laundry tub 124 via first drain opening 154. First drain opening 154 may be selectively opened and closed via a valve (not shown). In some embodiments, condensing duct 202 may be arranged such that condensed water droplets formed in condensing duct 202 are drained via first drain opening 154. In other words, condensing duct 202 may be positioned such that lower end 223 of condensing duct is positioned over first drain opening 154.

Additionally or alternatively, condensing duct 202 may define a second drain opening 156. As shown in FIG. 2, second drain opening 156 may be formed at lower end 223 of condensing duct 202. Accordingly, condensed water formed in condensing duct 202 may drain from condensing duct 202 via second drain opening 156. First drain opening 154 and/or second drain opening 156 may communicate with sump 142. Accordingly, water drained from laundry tub 124 and condensing duct 202 may collect in sump 142. Drain 146 may then allow the water collected in sump 142 to be drained from sump 142 and thus be drained from cabinet 102 (e.g., to an ambient environment or separate water line, such as for a municipal water system).

In a drying operation, warm moist air WA exiting laundry tub 124 via air outlet 228 may enter condensing duct 202 at lower end 223 thereof. The movement of air through air circulation duct may be urged by blower fan 206. The warm moist air WA may pass through filter 208 via warm air end 212. Foreign material (e.g., lint, debris) may be filtered out by filter 208 (e.g., surface 214) and may adhere to filter 208. As the warm moist air WA travels along condensing duct 202, condensed water may form along interior wall 207 of condensing duct 202 (e.g., as water droplets). The condensed water or water droplets may then flow or fall downward (e.g., in the vertical direction V) within condensing duct 202 (e.g., along interior wall 207). Additionally or alternatively, as mentioned above, cold water supplied from the home supply may contact with filter 208 to collect and remove foreign materials that adhere to filter 208. As the condensed water approach filter 208, the condensed water may begin to cascade or flow down surface 214 of filter 208. Accordingly, the condensed water may remove the foreign materials collected on filter 208 (e.g., surface 214). Upon reaching warm air end 212 of filter 208, the condensed water and foreign materials may drop via gravity to lower end 223 of condensing duct 202. In some embodiments, the condensed water and foreign materials drop to a bottom of laundry tub 124. Subsequently, the condensed water and foreign materials may be collected in sump 142 and drained via drain 146. Advantageously, in a recirculation drying operation in a combination washer/dryer laundry treatment appliance, a filter (e.g., filter 208) may be self-cleaning, eliminating the need to routinely remove and manually clean lint or foreign materials from the filter. This may in turn improve performance and longevity of internal components of the system (e.g., blower fan 206, heater 205, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry treatment appliance, comprising:
   a cabinet;
   a door to selectively open and close the cabinet;
   a tub mounted within the cabinet;
   a drum rotatably mounted within the tub;
   an air circulation duct provided in the cabinet and having a first end connected to an air outlet of the tub and a second end connected to an air inlet of the tub; and
   a filter provided within the air circulation duct spaced away from the first end of the air circulation duct, the filter defining a cool air end having a perimeter thereof attached to an interior wall of the circulation duct and a warm air end having a perimeter thereof spaced apart from the interior wall of the circulation duct, wherein the second end is positioned below the first end in a vertical direction.

2. The laundry treatment appliance of claim 1, wherein the air circulation duct comprises a condensing duct provided at a rear of the tub and a heating plenum provided at a top of the tub.

3. The laundry treatment appliance of claim 2, wherein the condensing duct is arranged vertically within the cabinet having a lower end located at a bottom of the tub and an upper end located at a top of the tub.

4. The laundry treatment appliance of claim 3, wherein the filter is provided in the condensing duct.

5. The laundry treatment appliance of claim 4, further comprising:
   a blower fan provided within the heating plenum to circulate air through the air circulation duct; and
   a heater provided in the heating plenum downstream from the blower fan.

6. The laundry treatment appliance of claim 5, wherein the filter is provided upstream from the blower fan.

7. The laundry treatment appliance of claim 1, wherein the filter defines a conical taper from the cool air end to the warm air end.

8. The laundry treatment appliance of claim 1, wherein the filter comprises a wire mesh.

9. The laundry treatment appliance of claim 1, wherein the condensing duct defines a drain outlet at a bottom of the condensing duct.

10. The laundry treatment appliance of claim 1, wherein a surface of the filter is provided over an entirety of a cross section of the condensing duct.

11. A clothes treatment appliance defining a vertical direction, a lateral direction, and a transverse direction, the clothes treatment appliance comprising:
   a cabinet;
   a door to selectively open and close the cabinet;
   a drum mounted within the cabinet;
   an air circulation duct provided in the cabinet and having a first end connected to an air outlet of the drum and a second end connected to an air inlet of the drum; and
   a filter provided within the air circulation duct, the filter defining a cool air end having a perimeter thereof attached to an interior wall of the circulation duct and a warm air end having a perimeter thereof spaced apart from the interior wall of the circulation duct, wherein the warm air end is positioned below the cool air end in the vertical direction, and wherein the filter defines a conical taper from the cool air end to the warm air end.

12. The clothes treatment appliance of claim 11, wherein the air circulation duct comprises a condensing duct provided at a rear of the drum and a heating plenum provided at a top of the drum.

13. The clothes treatment appliance of claim 12, wherein the condensing duct is arranged vertically within the cabinet having a lower end located at a bottom of the drum and an upper end located at a top of the drum.

14. The clothes treatment appliance of claim 13, further comprising:
   a blower fan provided within the heating plenum to circulate air through the air circulation duct; and
   a heater provided in the heating plenum downstream from the blower fan.

15. The clothes treatment appliance of claim 14, wherein the filter is provided upstream from the blower fan.

16. The clothes treatment appliance of claim 11, wherein the filter comprises a wire mesh.

17. The clothes treatment appliance of claim 11, wherein the condensing duct defines a drain outlet at a bottom of the condensing duct.

18. The clothes treatment appliance of claim 11, wherein a surface of the filter is provided over an entirety of a cross section of the condensing duct.

\* \* \* \* \*

UNITED STATES PATENT AND TRADEMARK OFFICE
CERTIFICATE OF CORRECTION

| | | |
|---|---|---|
| PATENT NO. | : 11,828,017 B2 | Page 1 of 1 |
| APPLICATION NO. | : 17/116055 | |
| DATED | : November 28, 2023 | |
| INVENTOR(S) | : David Zhou | |

It is certified that error appears in the above-identified patent and that said Letters Patent is hereby corrected as shown below:

On the Title Page

Under Assignee item (73) reads "Dority & Manning, P.A., Wilmington, DE (US)" should read "Haier US Appliance Solutions, Inc., Wilmington, DE (US)"

Signed and Sealed this
Fourth Day of June, 2024

Katherine Kelly Vidal
*Director of the United States Patent and Trademark Office*